(12) United States Patent  
Parkhurst et al.

(10) Patent No.: US 12,050,115 B2
(45) Date of Patent: Jul. 30, 2024

(54) PRODUCT TESTING WITH SYNCHRONIZED CAPTURE AND PRESENTATION OF MULTIMEDIA AND SENSOR DATA

(71) Applicant: Right Testing Labs, College Park, GA (US)

(72) Inventors: Stephen Scott Parkhurst, College Park, GA (US); Drew Matthew Mersereau, College Park, GA (US); Carl Thomas Archbold, San Diego, CA (US)

(73) Assignee: Right Testing Labs, College Park, GA (US)

( * ) Notice: Subject to any disclaimer, the term of this patent is extended or adjusted under 35 U.S.C. 154(b) by 0 days.

(21) Appl. No.: 17/335,389

(22) Filed: Jun. 1, 2021

(65) Prior Publication Data

US 2021/0372831 A1    Dec. 2, 2021

Related U.S. Application Data

(60) Provisional application No. 63/032,803, filed on Jun. 1, 2020.

(51) Int. Cl.
 *G01D 21/00*  (2006.01)
 *G01M 99/00*  (2011.01)
 *G06F 9/451*  (2018.01)

(52) U.S. Cl.
 CPC .......... *G01D 21/00* (2013.01); *G01M 99/001* (2013.01); *G06F 9/451* (2018.02)

(58) Field of Classification Search
 CPC .......... G01D 21/02; G05B 2219/37331; G05B 2219/40412; G05B 2219/25482;
 (Continued)

(56) References Cited

U.S. PATENT DOCUMENTS 3,665,750 A * 5/1972 Dawn .................... G01N 25/50
 374/8
3,930,397 A * 1/1976 Suga ...................... G01N 25/50
 374/8

(Continued)

FOREIGN PATENT DOCUMENTS

CN       108061667 A  *  5/2018  .......... G01M 99/002
WO  WO-2008116037 A1 *  9/2008  .............. F23G 5/50

*Primary Examiner* — Lisa M Caputo
*Assistant Examiner* — Eric Sebastian Von Wald
(74) *Attorney, Agent, or Firm* — Genius Patent APC; Bruce Hare

(57) ABSTRACT

A test manager and media interface (TMMI) may manage testing procedures associated with a test such as a product test, capture media and sensor data associated with the test, and generate a synchronized multimedia presentation based on the captured media and sensor data. A TMMI include: a test environment having: a test applicator for applying a test stimulus to an item under test; a sensor that measures at least one test attribute; and a media capture element that captures media including video of the item under test. The TMMI may include a media interface that generates a graphical user interface including at least a portion of the media captured by the media capture element and the at least one attribute.

20 Claims, 5 Drawing Sheets

(58) Field of Classification Search
CPC ........... G05B 2219/31217; G05B 2219/34208;
G05B 2219/34215; G05B 2219/24102;
G05B 2219/25342; G05B 2219/34216;
G05B 2219/34427; G05B 2219/31076;
G05B 2219/33161; G05B 2219/24048;
G05B 2219/24056; G05B 23/024; G05B
19/4183; G05B 19/41845; G05B
19/41875; G05B 2219/32287; G05B
23/0221; G05B 23/0286; G05B 23/0297;
G05B 2219/2649; G05B 19/042; G05B
19/102; G05B 23/0208; G05D 23/1919;
G06F 9/451; G06F 9/06; G06F 9/30;
G06F 18/00; G06F 18/217; G06V
30/1918; G06V 30/191; G06V 30/19;
G06V 30/192; G06V 30/196; G06V
30/20; G06V 30/2552; G06V 30/26;
G06V 30/262; G06V 10/80; G06V
10/806; G06V 10/88; G06V 10/94; G06V
10/776; G06K 9/6288; G06K 9/62; G06K
9/629; G01M 99/001; G01M 99/002;
G01N 2203/022; G01N 2203/0202; G01N
2035/00099; G01N 2203/0226; G01N
3/60; G01N 3/18; F23G 5/50; F23G 5/00;
F23N 5/082; F23N 2229/20; F23N
2241/12; F23N 2241/11; G02F 1/13338;
H04N 23/631

See application file for complete search history.

(56) References Cited

U.S. PATENT DOCUMENTS

| | | | | |
|---|---|---|---|---|
| 5,210,985 | A * | 5/1993 | Hsu | A62C 3/00 52/106 |
| 6,691,070 | B1 * | 2/2004 | Williams | G06F 11/3688 702/184 |
| 2001/0014436 | A1 * | 8/2001 | Lemelson | F23N 1/022 431/12 |
| 2005/0117625 | A1 * | 6/2005 | Ogle | G01N 25/18 374/141 |
| 2005/0254775 | A1 * | 11/2005 | Hamilton | G06F 9/451 714/E11.193 |
| 2009/0015837 | A1 * | 1/2009 | Behrendt | G01M 99/002 356/417 |
| 2009/0168833 | A1 * | 7/2009 | Sarabi | G01N 25/50 374/8 |
| 2011/0110393 | A1 * | 5/2011 | Kim | G01N 3/08 374/51 |
| 2014/0290328 | A1 * | 10/2014 | Wang | G01N 33/007 73/1.06 |
| 2017/0148184 | A1 * | 5/2017 | Kraus | G06T 17/00 |
| 2019/0146467 | A1 * | 5/2019 | Schirrmann | G06F 11/0739 702/108 |
| 2019/0324444 | A1 * | 10/2019 | Cella | G05B 19/4185 |
| 2019/0361694 | A1 * | 11/2019 | Gordon | G06F 1/3231 |
| 2020/0073866 | A1 * | 3/2020 | Joyner | G06F 16/156 |
| 2020/0094401 | A1 * | 3/2020 | Cheng | B25J 9/163 |

* cited by examiner

PRODUCT TESTING WITH SYNCHRONIZED CAPTURE AND PRESENTATION OF MULTIMEDIA AND SENSOR DATA

CROSS-REFERENCE TO RELATED APPLICATIONS

This application claims priority to U.S. Provisional Patent Application Ser. No. 63/032,803, filed on Jun. 1, 2020.

BACKGROUND

Many types of equipment, devices, products, etc. may be subjected to various testing requirements. Current solutions may provide data that is incomplete and fails to include recorded media of a test.

Therefore there exists a need for a way to present merged media related to the test.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways to manage testing procedures associated with a test such as a product test, capture media and sensor data associated with the test, and generate a synchronized multimedia presentation based on the captured media and sensor data.

Figure 1:
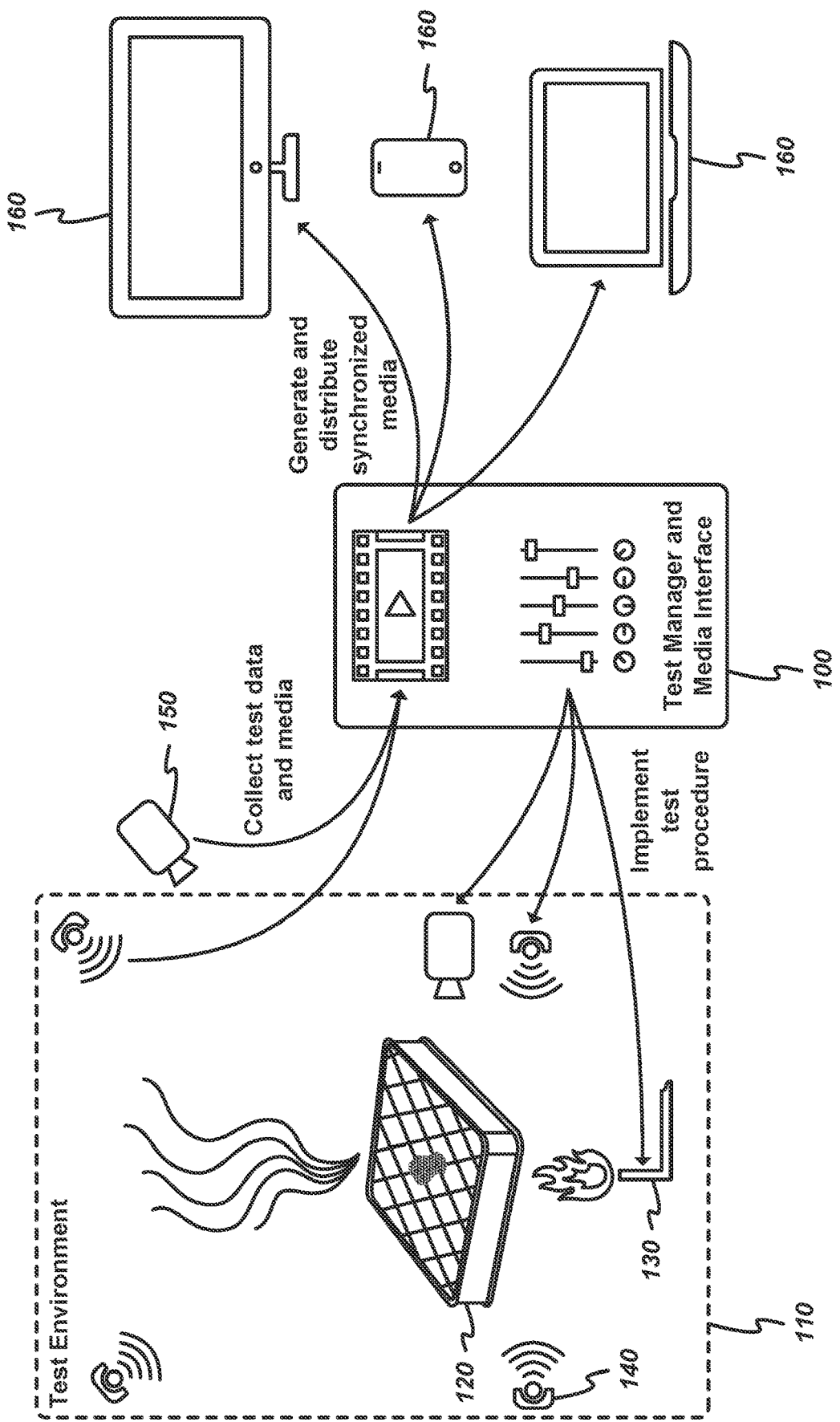
FIG. 1 illustrates an example overview of one or more embodiments described herein, in which a test is performed, and merged media is generated and distributed.

FIG. 1 illustrates an example overview of one or more embodiments described herein, in which a test is performed, and merged media is generated and distributed. In this example, the test is a fire or flame test and captured media includes video media. Such an approach may be applied to various different types of test, test subjects, etc.

As shown, test manager and media interface (TMMI) 100 may implement a test procedure associated with a test performed via test environment 110. Test environment 110 may include an item under test 120, various test applicators 130, a set of sensors 140, and media capture elements 150. The test procedure may include various control settings, time limits, automation triggers, thresholds, etc. The test procedure may be implemented using various software or applications, user interfaces, etc. associated with the TMMI 100. In some embodiments, test environment 110 may be a component of TMMI 100.

In this example, a technician or other user may set up the test environment 110, by placing the item(s) under test 120 (a mattress in this example) in a specified location and/or orientation. The mattress or other item under test 120 may be held in position using various frames, supports, clamps, etc., as may be needed to secure the mattress 120 and that are able to withstand the applied test conditions. In some cases, depending on the item under test 120, each item may be retrieved automatically and/or positioned automatically using various robotic arms, tracks, etc.

This example includes a single flame burner as the only test applicator 130. Different embodiments may have different numbers, types, arrangements, etc. of test applicator 130 that may be able to apply various types of test stimulus or stimuli. For instance, multiple single flame burners may be placed in an array beneath the item under test 130. Test applicators 130 may include elements such as heat sources, cold sources, load cells, physical manipulators, and/or other appropriate test application elements. In some embodiments, the test environment 110 may include one or more environment test applicators 130, such as an air conditioner, heater, rain simulator, wind machine, etc. that may apply environmental conditions across the interior of environment 110.

In this example, TMMI 100 may implement the test procedure by applying various control settings associated with the single flame burner 130, such as output level or temperature, start time, stop criteria, etc. In some embodiments, TMMI 100 may at least partly control the position or orientation of test applicators 130 (e.g., by moving the applicator to different positions relative to the item under test 120).

The TMMI 100 may implement the test procedure by interacting with various sensors 140 and/or media capture elements 150. For instance, TMMI 100 may send power on or activation messages to the sensors 140 and media capture elements 150 as the test procedure is initiated.

Different embodiments may include various different configurations of sensors 140 and/or media capture elements 150. Such different configurations may include different types of elements, different arrangements of elements, different numbers of elements, etc.

As the test is performed, the TMMI 100 may collect test data via sensors 140 and media via media capture elements 150. Such media may include, for instance, video captured using one or more video cameras 150. Test data may include, for instance, time, heat release, gas densities (e.g., oxygen, carbon dioxide, and/or carbon monoxide in parts per million), and/or other relevant types of data depending on the test procedure, available sensors 140, and/or other relevant factors.

Based on the test procedure, collected data, inputs received from a user or technician, and/or other relevant factors, TMMI 100 may adjust various test parameters (e.g., by increasing or decreasing output level of the burner 130, changing the position or orientation of the burner 130, activating or deactivating various sensors 140, changing the position or orientation of the sensors 140, adjusting settings associated with one or more cameras 150, changing the position or orientation of the cameras 150, etc.).

The collected test data and media may be used to generate a synchronized media item that may be distributed to various sets of client devices 160. The synchronized media item may be provided, for instance, as a live video or data stream during a test or stored to a file. TMMI 100 may generate the synchronized media item using various internal and/or external media editors, analyzers, and/or other appropriate tools. GUI 200 described below illustrates an example of such a synchronized media item output.

Figure 2:
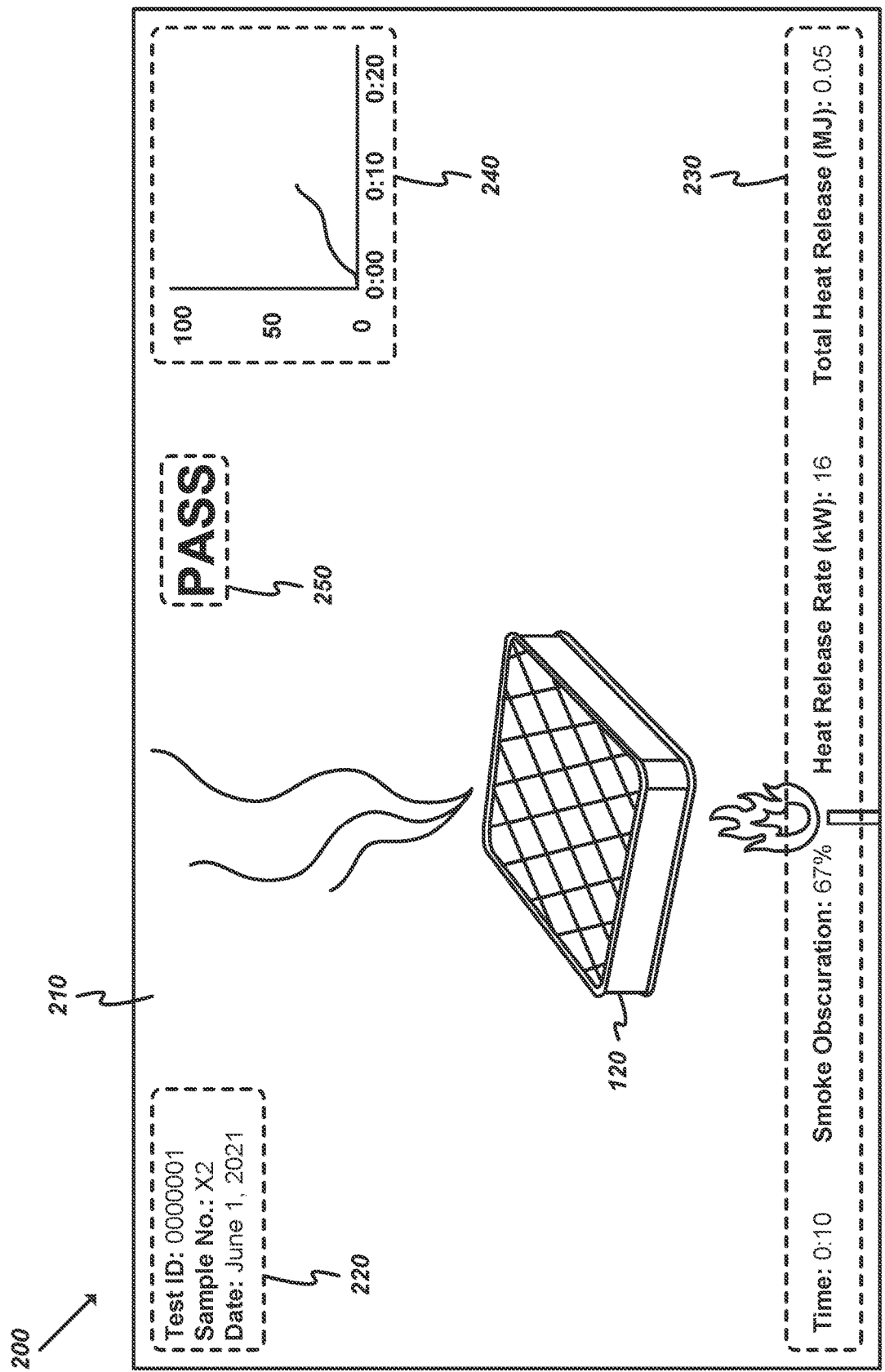
FIG. 2 illustrates an example graphical user interface (GUI) of one or more embodiments described herein, in which video of a test is merged with collected sensor data.

FIG. 2 illustrates an example graphical user interface (GUI) 200 of one or more embodiments described herein, in which video of a test is merged with collected sensor data. Such a GUI 200 may be generated by a resource such as TMMI 100. Media may be captured by resources such as cameras 150. Test data may be collected using elements such as sensors 140. GUI 200 may be provided via resources such as client device 160.

In this example, GUI 200 includes captured video media 210, bibliographic information element 220, text-based test data 230, graphical test data 240, and a result (or current result) indicator 250. Different embodiments may include various different combinations of such elements, locations of elements, numbers of elements, etc. GUI 200 may be generated based on attributes associated with a user (e.g., a set of viewer selections or preferences), test procedure (e.g., a set of available measurements or data), test results (e.g., comparison of measurements to one or more thresholds, etc.), available media (e.g., single camera or multi-camera), presentation templates or profiles (e.g., a GUI template associated with a particular test type), and/or other relevant factors or attributes.

The captured media 210 in this example includes video of a mattress undergoing a flame test. Different embodiments may present different sets and/or types of captured media 210. For instance, some tests may be associated with multiple cameras 150. The resulting captured media may be combined and/or presented in various different ways. For instance, a single camera view may be shown at a time and a selection feature (e.g., a button or drop-down menu) may be provided such that a user can select among the different views. As another example, multiple camera views may be combined into a mosaic presentation. As still another example, the captured media 210 may cycle among the different camera views at regular intervals (e.g., every five seconds). As yet another example, captured media 210 may include media captured with different types of cameras or sensors (e.g., visual or optical cameras, infrared cameras, etc.). The captured media 210 may generally show at least a portion of the item under test and/or the surrounding environment.

The bibliographic information element 220 in this example includes a unique test identifier, product sample number, and test date. Various relevant data elements may be included in such a bibliographic information element 220. For instance, bibliographic information may include a unique test type identifier. Such test type identifiers may be associated with test types (e.g., fire, water, pressure, exposure, etc.), testing standards (e.g., National Fire Protection Association standards, American Society for Testing and Materials (ASTM) International standards, Code of Federal Regulations (CFR), UL standards, etc.). As another example, bibliographic information may include a client or brand name associated with a product, a project number, or a client reference number.

The text-based test data 230, graphical test data 240, and/or other types of test data elements (e.g., discrete indicators such as "low", "normal", "high", etc. as indicated by text, color, graphics, etc.) may include various combinations of measured and/or calculated data, reference values or limits, historic or model test data, and/or other relevant information. The specific test data elements that are included via GUI 200 may be selected based on various relevant factors (e.g., user preference, test type, available data types, etc.). In this example, as flame is applied by test applicator 130 sensor measurements including heat release may be provided in various formats (e.g., total, rate of release, rate over time, etc.) via text-based test data 230 and/or graphical test data 240.

The result indicator 250 may indicate various types of overall or merged results, if applicable. Such results may include discrete values (e.g., "pass", "fail", "incomplete", etc.), scores or metrics (e.g., a calculated percentage on a scale from zero to one hundred), grades (e.g., "minimally acceptable", "acceptable", "grade A", "highest level", etc.), and/or other appropriate result indication elements. In some embodiments, the result indicator 250 may include multiple elements and/or values (e.g., "pass—95%", "fail—53%", "pass—minimally acceptable", "pass—acceptable—75%", etc.).

In some embodiments, result indicators 250 may be provided for multiple attributes. For instance, such indicators may provide an overall test result (e.g., "pass"), and various individual measurement values and/or grades (e.g., "smoke obscuration—acceptable", "total heat release—0.05MJ—highest-performance", etc.).

The GUI 200 may be generated by TMMI 100 during a test and provided as a live video stream in some embodiments. A media item including GUI 200 may be stored for later viewing or retrieval. GUI 200 may include various controls, inputs, etc. (e.g., playback controls, sensor selection features, presentation type selection, etc.) that may allow a user to control and/or customize the displayed content in various ways.

Figure 3:
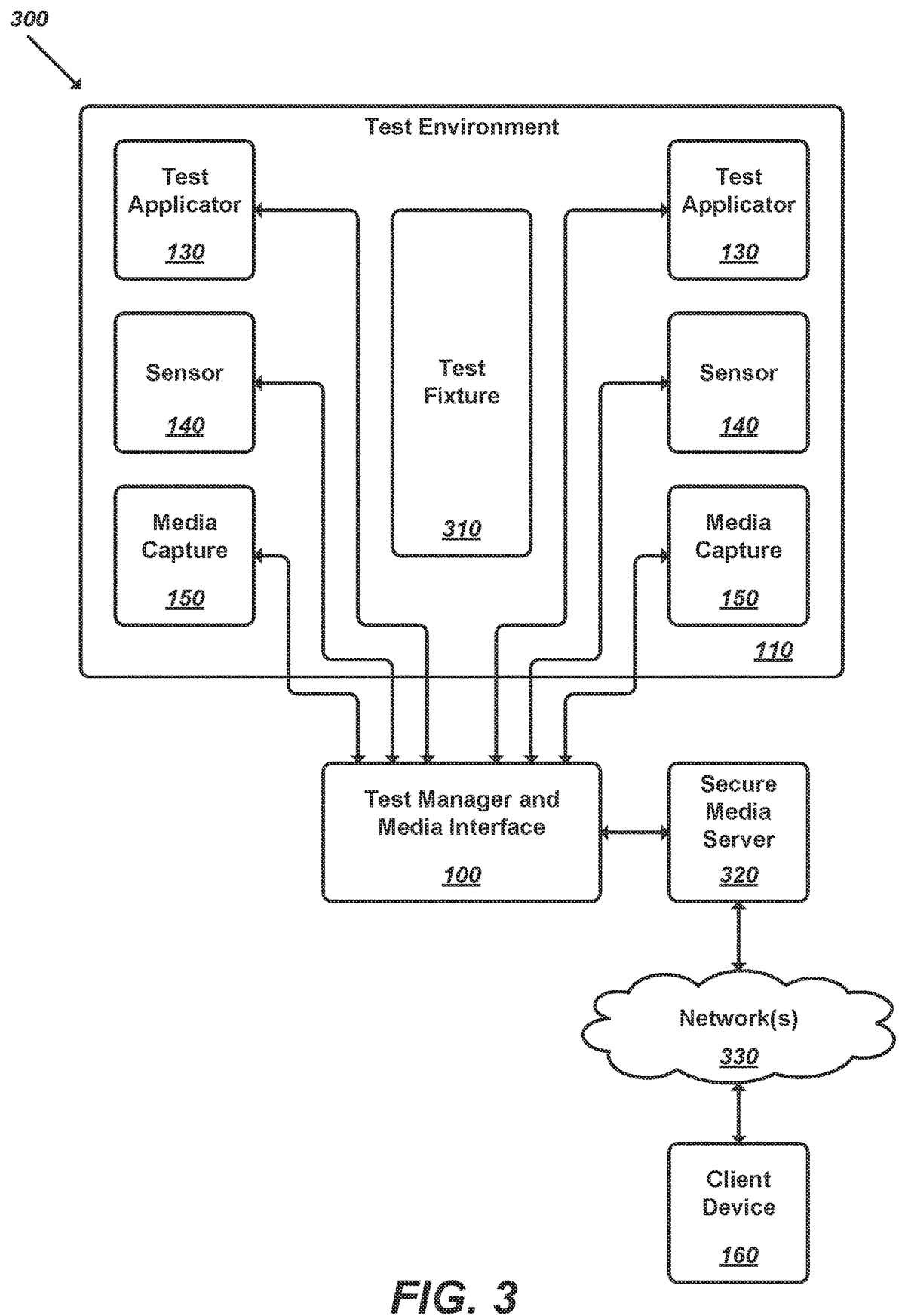
FIG. 3 illustrates a schematic block diagram of an example environment associated with one or more embodiments described herein.

FIG. 3 illustrates a schematic block diagram of an example environment 300 associated with one or more embodiments described herein. As shown, environment 300 may include TMMI 100, test environment 110, test applicators 130, sensors 140, media capture elements 150, client devices 160, test fixtures 310, secure media servers 320, and/or networks 330.

TMMI 100 may include one or more electronic devices or components that may at least partly control the operations of the test applicators 130, sensors 140, media capture elements 150, test fixtures 310, and/or secure media server 320. For instance, the TMMI 100 may send a "start test" and/or other appropriate message to a set of test applicators 130, sensors 140, and/or media capture elements 150 in order to initiate a test and/or modify test conditions or parameters during execution of a test. As another example, TMMI 100 may control an element such as a switch or solenoid associated with a test applicator 130 via a communication bus or other appropriate channel. The TMMI 100 may adjust test applicator parameters (and/or other test parameters) based on measured values. For instance, if a flame test results in a measured value that exceeds some test limit (e.g., an amount of released carbon dioxide exceeds a maximum threshold), the test applicator may be disabled and a time of failure may be recorded. As another example, if a measured value is well below a test limit, the test applicator 140 may be moved closer to the item under test, the associated output may be increased, and/or test conditions otherwise modified based on the measured values.

TMMI 100 may include various user interface elements, such as switches, knobs, keypads, etc. that may allow a user or technician to control various elements of environment 300. In some embodiments, a device such as client device 160 may be communicatively coupled to TMMI 100 (e.g., via a network connection) such that the client device 160 may at least partly direct the operations of TMMI 100.

The TMMI 100 may receive captured media and sensor data and generate a synchronized multimedia output with test data overlay, such as GUI 200. The received sensor data may be filtered or otherwise processed. The multimedia output may include one or more captured videos or feeds and the overlay may include sensor data, bibliographic data, test parameters or conditions, and/or other appropriate information.

Test environment 110 may include a room, area, container, etc. suitable for conducting the particular type of test. For instance, a flame or fire test may be performed in a fire-proof concrete structure, room, or enclosure. As another example, an atmospheric pressure test may be performed in a sealed metal chamber. Test environment 110 may include various available connectors, power supplies, fuel supplies, network connections or other communication interfaces, etc., as may be used by the various components associated with the test environment 110, such as test applicators 130, sensors 140, and/or media capture elements 150. Such communication interfaces may allow TMMI 100 to at least partly direct the operations of components associated with test environment 110.

Each test applicator 130 may include various control elements, supply reservoirs or supply lines, output or application features, and/or other components, as appropriate. For example, a "flame" or "burner" type applicator may include a reservoir of flammable material or a connection to a gas line or other appropriate supply. Continuing the fire example, attributes of the flame may be controllable (e.g., size, temperature, duration, etc.) such that test conditions may be varied across tests and/or during test execution. Other examples of test applicators 130 include, for instance, heat sources, air conditioners, coolers or refrigerators, ultraviolet or other light sources, sonic sources, manipulators (e.g., an item under test may be moved, stretched, compressed, etc. during the test), environmental simulators (e.g., wind, rain, and/or sunlight simulators), and/or other appropriate elements.

Each sensor 140 may include one or more devices or components that are able to sense some relevant attribute associated with the test environment and generate an output value based on the sensed attribute. Sensors may include, for instance, thermocouples, heat flux sensors, photocells, oxygen analyzers, carbon dioxide analyzers, carbon monoxide analyzers, and anemometers. Sensors may include devices such as clocks or timers.

Each media capture element 150 may be able to capture media associated with the test environment 110 and/or item under test 120. Examples of media capture elements 150 include cameras and microphones. Some test environments may be associated with multiple media capture elements 150 that may provide multiple views of a test. Depending on the type of test, and capabilities of the media capture elements 150, the media capture element 150 may be located inside the test environment or outside the test environment (e.g., a camera may be mounted outside a window such that the camera is not exposed to the conditions of the test environment 110).

Each client device 160 may be an electronic device capable of receiving and displaying multimedia and/or interacting with TMMI 100. Examples of client devices include smartphones, tablets, personal computers, laptops, wearable devices, etc.

The test fixture 310 may be able to support and/or secure various types of items under test 120. Each item under test 120 may be a product, substance, device, or other appropriate element suitable for testing. The test fixture 310 may include and/or be associated with various fittings or structural elements that may secure or otherwise manipulate the item under test. For example, a test fixture 310 for a mattress may include a flat metal support plate or screen similar to a bed frame.

The secure media server 320 may receive the multimedia output with test data overlay from the TMMI 100 and may provide the multimedia output via a local or distributed network to various client devices 160. Such data may be encrypted and/or otherwise secured. Further, access may be limited to specific users or parties associated with a given test.

The networks 330 may include wired networks (e.g., Ethernet), wireless networks (e.g., Wi-Fi), cellular networks, the Internet, and/or other appropriate communication channels (e.g., inter-device wireless communication channels such as Bluetooth).

Figure 4:
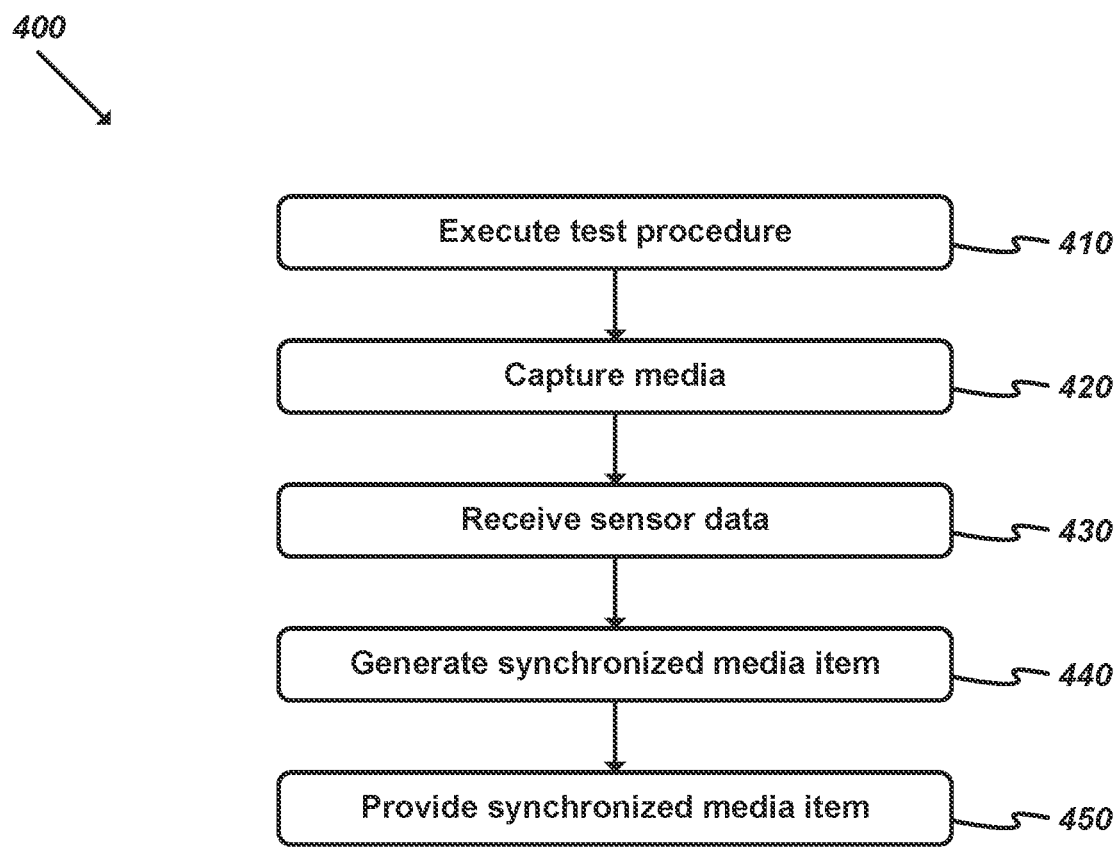
FIG. 4 illustrates a flow chart of an exemplary process that administers a test, captures test data, and generates a synchronized multimedia output based on the captured data.

FIG. 4 illustrates a flow chart of an exemplary process that administers a test, captures test data, and generates a synchronized multimedia output based on the captured data. Such a process may allow various parties to view and evaluate test results without being physically present at a test facility. The process may be performed when a test is initiated, such as when a command is received from an administrator or operator, at different stages of a test sequence, and/or under other appropriate conditions. In some embodiments, process 400 may be performed by TMMI 100.

As shown, process 400 may include executing (at 410) a test procedure. As described above, such test procedure execution may include, for instance, controlling test applicators 130, sensors 140, and/or media capture elements 150. The test procedure may be specified using various types of software, such that a given test procedure may be executed automatically by TMMI 100.

The process may include capturing (at 420) media. Such media may be captured by components such as the media capture elements 150 described above and/or other appropriate elements and received by TMMI 100. Captured media may include video and/or audio. Captured media may include different types of captured video or other media (e.g., standard, infrared, etc.), as appropriate for a particular test.

Process 400 may include receiving (at 430) sensor data. Sensor data may be received at TMMI 100 from sensors such as sensors 140 described above. Sensor data may include digital and/or analog signals that may be processed or filtered in various appropriate ways.

The process may include generating (at 440) a synchronized media item. The media or multimedia item may generally include video and data associated with at least one sensor measurement, and may be provided via a GUI such as GUI 200. The GUI may include sensor data, bibliographic information, and/or other appropriate information that may be presented with the captured media.

As shown, process 400 may include providing (at 450) the synchronized media item. In some cases, the multimedia may be stored or otherwise captured for future use. Some embodiments of the TMMI 100 may provide a secure web-based portal, dashboard, or other appropriate interface that may allow authorized users to view live streaming or previously generated and stored multimedia with overlaid test information.

One of ordinary skill in the art will recognize that process 400 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

As one example use case, some embodiments of TMMI 100 may implement a National Fire Protection Association (NFPA) 286 test procedure. The NFPA 286 test procedure may be associated with a test environment 110 that includes sensors 140 such as a paramagnetic oxygen analyzer, non-dispersive infrared (NDIR) carbon monoxide analyzer, NDIR carbon dioxide analyzer, optical density sensor, eight type K thermocouples, a differential pressure transducer, and a Schmidt-Boelter radiometer. Measured and/or calculated values may include heat release, total heat release, air velocity, mass flow, and time (or elapsed time). Displayed information may include heat release, seven temperatures (e.g., associated with seven different regions of the test environment 110), time, smoke opacity, and heat flux.

As a second example use case, some embodiments of TMMI 100 may implement a 16 CFR 1633 test procedure. The 16 CFR 1633 test procedure may be associated with a test environment 110 that includes sensors 140 such as a paramagnetic oxygen analyzer, NDIR carbon monoxide analyzer, NDIR carbon dioxide analyzer, optical density sensor, type K thermocouple, and a differential pressure transducer. Measured and/or calculated values may include heat release, total heat release, air velocity, mass flow, and time. Displayed information may include heat release, total heat release, time, and smoke opacity.

As a third example use case, some embodiments of TMMI 100 may implement an Underwriter Laboratories (UL) 9540A test procedure. The UL 9540A test procedure may be associated with a test environment 110 that includes sensors 140 such as a paramagnetic oxygen analyzer, NDIR carbon monoxide analyzer, NDIR carbon dioxide analyzer, total hydrocarbon analyzer, palladium film hydrogen sensor, optical density sensor, one hundred twenty-eight type K thermocouples, thermopile, differential pressure transducer, and eleven Schmidt-Boelter radiometers. Measured and/or calculated values may include heat release, total heat release, air velocity, mass flow, and time. Displayed information may include heat release, total heat release, time, hydrogen concentration, total hydrocarbons, eighteen temperatures, and smoke opacity.

As a fourth example use case, some embodiments of TMMI 100 may implement an ASTM E72 procedure. The ASTM E72 test procedure may be associated with a test environment 110 that includes sensors 140 such as twenty string potentiometers and ten load cells. Measured and/or calculated values may include load, deflection, and deflection vs. displacement. Displayed information may include maximum load.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 5:
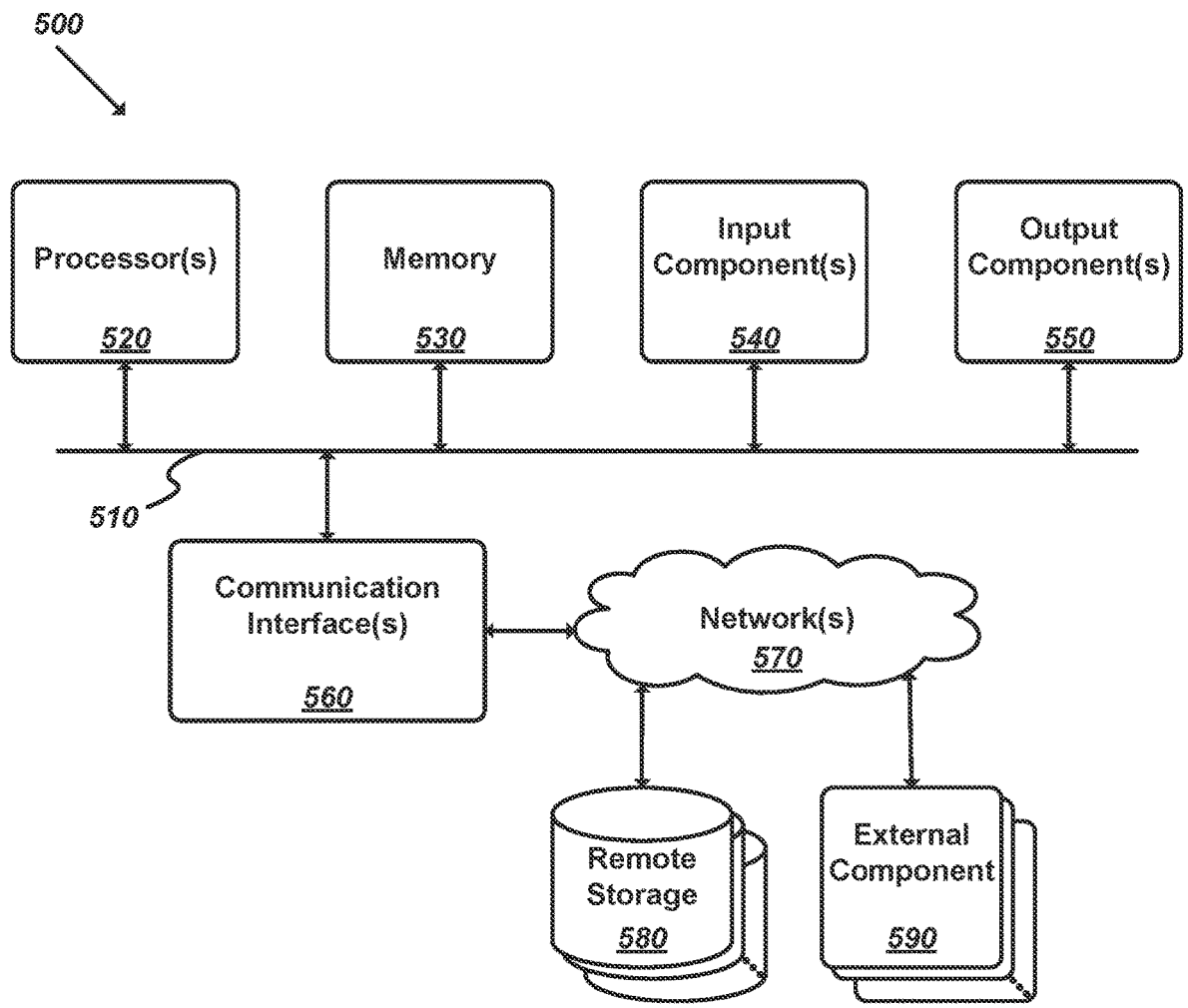
FIG. 5 illustrates a schematic block diagram of one or more exemplary devices used to implement various embodiments.

FIG. 5 illustrates a schematic block diagram of an exemplary device (or system or devices) 500 used to implement some embodiments. For example, the environment described above in reference to FIG. 3 may be at least partially implemented using device 500. As another example, the devices described above in reference to FIG. 1 and FIG. 3 may be at least partially implemented using device 500. As still another example, the GUIs and processes described in reference to FIG. 2 and FIG. 4 may be at least partially implemented using device 500.

Device 500 may be implemented using various appropriate elements and/or sub-devices. For instance, device 500 may be implemented using one or more personal computers (PCs), servers, mobile devices (e.g., smartphones), tablet devices, wearable devices, and/or any other appropriate devices. The various devices may work alone (e.g., device 500 may be implemented as a single smartphone) or in conjunction (e.g., some components of the device 500 may be provided by a mobile device while other components are provided by a server).

As shown, device 500 may include at least one communication bus 510, one or more processors 520, memory 530, input components 540, output components 550, and one or more communication interfaces 560.

Bus 510 may include various communication pathways that allow communication among the components of device 500. Processor 520 may include a processor, microprocessor, microcontroller, digital signal processor, logic circuitry, and/or other appropriate processing components that may be able to interpret and execute instructions and/or otherwise manipulate data. Memory 530 may include dynamic and/or non-volatile memory structures and/or devices that may store data and/or instructions for use by other components of device 500. Such a memory device 530 may include space within a single physical memory device or spread across multiple physical memory devices.

Input components 540 may include elements that allow a user to communicate information to the computer system and/or manipulate various operations of the system. The input components may include keyboards, cursor control devices, audio input devices and/or video input devices, touchscreens, motion sensors, etc. Output components 550 may include displays, touchscreens, audio elements such as speakers, indicators such as light-emitting diodes (LEDs), printers, haptic or other sensory elements, etc. Some or all of the input and/or output components may be wirelessly or optically connected to the device 500.

Device 500 may include one or more communication interfaces 560 that are able to connect to one or more networks 570 or other communication pathways. For example, device 500 may be coupled to a web server on the Internet such that a web browser executing on device 500 may interact with the web server as a user interacts with an interface that operates in the web browser. Device 500 may be able to access one or more remote storages 580 and one or more external components 590 through the communication interface 560 and network 570. The communication interface(s) 560 may include one or more application programming interfaces (APIs) that may allow the device 500 to access remote systems and/or storages and also may allow remote systems and/or storages to access device 500 (or elements thereof).

It should be recognized by one of ordinary skill in the art that any or all of the components of computer system 500 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 500 may perform various operations in response to processor 520 executing software instructions stored in a computer-readable medium, such as memory 530. Such operations may include manipulations of the output components 550 (e.g., display of information, haptic feedback, audio outputs, etc.), communication interface 560 (e.g., establishing a communication channel with another device or component, sending and/or receiving sets of messages, etc.), and/or other components of device 500.

The software instructions may be read into memory 530 from another computer-readable medium or from another device. The software instructions stored in memory 530 may cause processor 520 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

We claim:

1. A test manager and media interface comprising:
    a combustion test environment including:
        a set of test applicators for applying a test stimulus to an item under test, wherein the set of test applicators comprises a burner;
        a set of sensors that measures at least one test attribute related to combustion of the item under test, wherein the set of sensors comprises a thermocouple and a gas density sensor; and
        a set of media capture elements that captures media including video of the item under test; and
    a media interface that generates a graphical user interface (GUI) including:
        at least a portion of the media captured by the set of media capture elements,
        the at least one attribute measured by the set of sensors, and at least one sensor selection input that is associated with at least one sensor from the set of sensors,
    wherein the test manager and media interface implements a test procedure that indicates at least one control setting for at least one test applicator from the set of test applicators and the at least one control setting for at least one test applicator is automatically applied at the test environment by the test manager and media interface,
    wherein the test procedure indicates at least one control setting for at least one sensor from the set of sensors and the at least one control setting for at least one sensor is automatically applied at the test environment by the test manager and media interface, and
    wherein the test procedure indicates at least one control setting for at least one media capture element from the set of media capture elements and the at least one control setting for at least one media capture element is automatically applied at the test environment by the test manager and media interface.

2. The test manager and media interface of claim 1, wherein:
the set of test applicators comprises heat source, cold source, ultraviolet light source, sonic source, physical manipulator, and environmental simulator, and
the set of sensors comprises heat flux sensor, photocell, oxygen analyzer, carbon dioxide analyzer, carbon monoxide analyzer, and anemometer.

3. The test manager and media interface of claim 1, wherein the at least one attribute comprises heat release, air velocity, mass flow, smoke opacity, hydrogen concentration, total hydrocarbons, and temperature.

4. The test manager and media interface of claim 1, wherein the test environment further includes a fire-proof concrete structure.

5. The test manager and media interface of claim 1, wherein the GUI is provided via streaming data during test execution and the GUI is stored to a multimedia file.

6. The test manager and media interface of claim 1, wherein the at least one control setting for at least one test applicator from the set of test applicators is output level, start time, or stop criteria.

7. The test manager and media interface of claim 1, wherein the at least one control setting for at least one media capture element from the set of media capture elements is power or activation and the set of sensors comprises a heat flux sensor, oxygen analyzer, carbon dioxide analyzer, carbon monoxide analyzer, and anemometer.

8. A combustion test environment comprising:
a set of test applicators for applying a test stimulus to an item under test, wherein the set of test applicators comprises a burner;
a set of sensors that measures at least one test attribute related to combustion of the item under test, wherein the set of sensors comprises a thermocouple and a gas density sensor; and
a set of media capture elements that captures media including video of the item under test; and
a test manager and media interface that generates a graphical user interface (GUI) including:
at least a portion of the media captured by the set of media capture elements,
the at least one attribute measured by the set of sensors,
and at least one sensor selection input that is associated with at least one sensor from the set of sensors,
wherein the test manager and media interface implements a test procedure that indicates at least one control setting for at least one test applicator from the set of test applicators and the at least one control setting for at least one test applicator is automatically applied at the test environment by the test manager and media interface,
wherein the test procedure indicates at least one control setting for at least one sensor from the set of sensors and the at least one control setting for at least one sensor is automatically applied at the test environment by the test manager and media interface, and
media capture element from the set of media capture elements and the at least one control setting for at least one media capture element is automatically applied at the test environment by the test manager and media interface.

9. The test environment of claim 8, wherein:
the set of test applicators comprises a heat source, cold source, ultraviolet light source, sonic source, physical manipulator, and environmental simulator, and
the set of sensors comprises heat flux sensor, photocell, oxygen analyzer, carbon dioxide analyzer, carbon monoxide analyzer, and anemometer.

10. The test environment of claim 8, wherein the at least one attribute comprises heat release, air velocity, mass flow, smoke opacity, hydrogen concentration, total hydrocarbons, and temperature.

11. The test environment of claim 8 further comprising a fire-proof concrete structure.

12. The test environment of claim 8, wherein the GUI is provided via streaming data during test execution and the GUI is stored to a multimedia file.

13. The test environment of claim 8, wherein the at least one control setting for at least one test applicator from the set of test applicators is output level, start time, or stop criteria.

14. The test environment of claim 8, wherein the at least one control setting for at least one media capture element from the set of media capture elements is power or activation and the set of sensors comprises a heat flux sensor, oxygen analyzer, carbon dioxide analyzer, carbon monoxide analyzer, and anemometer.

15. A method of executing a combustion test, the method comprising:
directing, by a test manager, a set of test applicators to apply a test stimulus to an item under test based on a test procedure that indicates at least one control setting for at least one test applicator from the set of test applicators and the at least one control setting for at least one test applicator is automatically applied to the item under test by the test manager, wherein:
the set of test applicators comprises a burner;
measuring, at a set of sensors, at least one test attribute related to combustion of the item under test, wherein the set of sensors comprises a thermocouple and a gas density sensor, and the test procedure indicates at least one control setting for at least one sensor from the set of sensors and the at least one control setting for at least one sensor is automatically applied to the item under test by the test manager;
capturing, at a set of media capture elements, media including video of the item under test, wherein the test procedure indicates at least one control setting for at least one media capture element from the set of media capture elements and the at least one control setting for at least one media capture element is automatically applied to the item under test by the test manager; and
generating, at a media interface, a graphical user interface (GUI) including:
at least a portion of the media captured by the set of media capture elements,
the at least one attribute measured by the set of sensors,
and at least one sensor selection input that is associated with at least one sensor from the set of sensors.

16. The method of claim 15, wherein:
the set of test applicators comprises a heat source, cold source, ultraviolet light source, sonic source, physical manipulator, and environmental simulator, and
the set of sensors comprises a heat flux sensor, photocell, oxygen analyzer, carbon dioxide analyzer, carbon monoxide analyzer, and anemometer.

17. The method of claim 15, wherein the at least one attribute comprises heat release, air velocity, mass flow, smoke opacity, hydrogen concentration, total hydrocarbons, and temperature.

18. The method of claim 15 further comprising providing the GUI via streaming data during test execution and storing the GUI to a multimedia file.

19. The method of claim 15, wherein the at least one control setting for at least one test applicator from the set of test applicators is output level, start time, or stop criteria.

20. The method of claim 15, wherein the at least one control setting for at least one media capture element from the set of media capture elements is power or activation and the set of sensors comprises a heat flux sensor, oxygen analyzer, carbon dioxide analyzer, carbon monoxide analyzer, and anemometer.

* * * * *